(12) United States Patent
Bravo et al.

(10) Patent No.: US 9,140,589 B2
(45) Date of Patent: Sep. 22, 2015

(54) INSTRUMENT PANEL CLUSTER

(71) Applicant: Continental Automotive Systems, Inc., Auburn Hills, MI (US)

(72) Inventors: Maria Nohemi Bravo, Zapopan (MX); Gerado Arturo Samaniego Cárdenas, Tlajomulco de Zuniga (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 93 days.

(21) Appl. No.: 14/132,460

(22) Filed: Dec. 18, 2013

(65) Prior Publication Data

US 2014/0168938 A1 Jun. 19, 2014

Related U.S. Application Data

(60) Provisional application No. 61/738,430, filed on Dec. 18, 2012.

(51) Int. Cl.
*B60K 37/02* (2006.01)
*G01D 13/26* (2006.01)
*G01D 11/28* (2006.01)

(52) U.S. Cl.
CPC ............. *G01D 13/265* (2013.01); *B60K 37/02* (2013.01); *G01D 11/28* (2013.01); *B60K 2350/203* (2013.01); *B60K 2350/408* (2013.01)

(58) Field of Classification Search
CPC ............................... B60Q 3/04; B60Q 3/0293
USPC .................................. 362/23.01, 23.07, 23.14
See application file for complete search history.

(56) References Cited

U.S. PATENT DOCUMENTS

| | | | | |
|---|---|---|---|---|
| 7,724,129 B2* | 5/2010 | Altomonte | ................ | 340/461 |
| 7,758,195 B2* | 7/2010 | Feit | ................ | 362/23.15 |
| 2003/0056608 A1* | 3/2003 | Ishimaru | ................ | 73/866.3 |

\* cited by examiner

*Primary Examiner* — Ali Alavi

(57) ABSTRACT

An instrument cluster assembly is disclosed and includes at least one gauge. The gauge includes a dial surface having a primary scale and a secondary scale. A needle indicator assembly comprising a primary needle and a secondary needle is rotatable about an axis and spaced from the dial surface. The tip of the primary needle is positioned to indicate on the primary scale, and the tip of the secondary needle is positioned to indicate on the secondary scale. The gauge further includes a primary light source for illuminating the primary needle and a secondary light source for illuminating the secondary needle. The primary light source and the secondary light source are independently illuminable.

20 Claims, 3 Drawing Sheets

US 9,140,589 B2

INSTRUMENT PANEL CLUSTER

CROSS REFERENCE TO RELATED APPLICATION

This application claims priority to U.S. Provisional Application No. 61/738,430 filed on Dec. 18, 2012.

BACKGROUND

The present disclosure is related generally to instrument clusters for vehicles.

Vehicles include instrument clusters and gauges for communicating desired operating parameters such as vehicle speed, engine rpm and direction indicators. Different methods and devices are known for communicating this information. Each method and device provides not only the function of communicating operating information to a driver, but also form and contribute to the style and aesthetic appearance of a vehicle interior. Accordingly, it is desirable to develop new and unique devices and methods for communicating and representing vehicle operating information to contribute to a desired appearance.

SUMMARY

An instrument cluster assembly is disclosed and includes at least one gauge. The gauge includes a dial surface having a primary scale and a secondary scale. A needle indicator assembly comprising a primary needle and a secondary needle is rotatable about an axis and spaced from the dial surface. The tip of the primary needle is positioned to indicate on the primary scale, and the tip of the secondary needle is positioned to indicate on the secondary scale. The gauge further includes a primary light source for illuminating the primary needle and a secondary light source for illuminating the secondary needle. The primary light source and the secondary light source are independently illuminable.

The gauge may further include a primary scale light source for illuminating the primary scale and a secondary scale light source for illuminating the secondary scale. The primary scale light source and secondary scale light source would then also be independently illuminable.

This independent illumination allows for various combinations for selectively illuminating the primary needle, secondary needle, primary scale, and secondary scale, based on a vehicle operator's input or a vehicle's environment.

These and other features disclosed herein can be best understood from the following specification and drawings, the following of which is a brief description.

DETAILED DESCRIPTION

Figure 1:
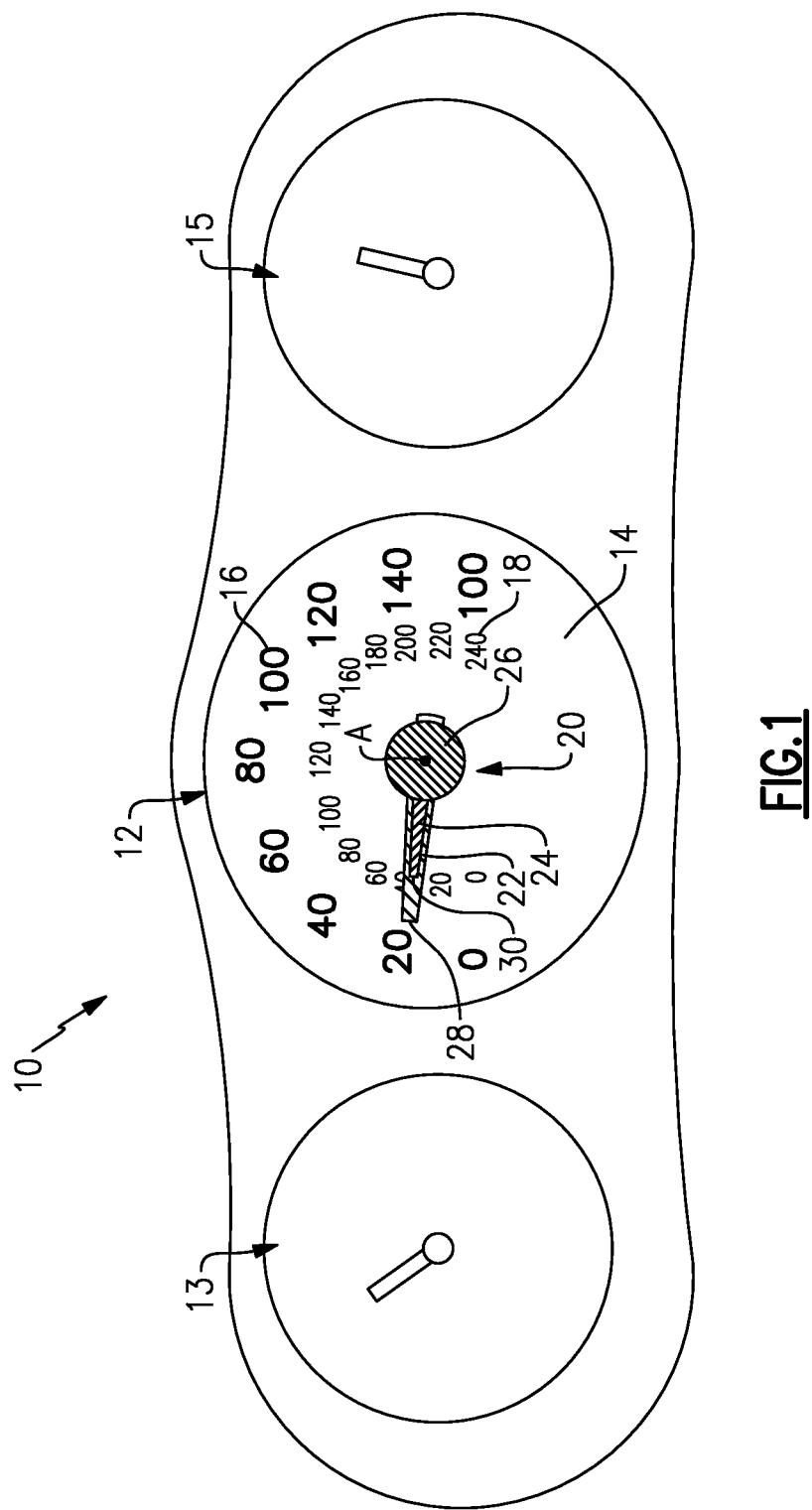
FIG. 1 is a front view of an example instrument cluster assembly.

Referring to FIG. 1, an example instrument cluster assembly includes a primary gauge 12 and secondary gauges 13 and 15. The example gauge 12 includes a dial surface 14 having a primary scale 16 and a secondary scale 18. A needle indicator assembly 20, which may also be known as a pointer assembly, is spaced apart from the dial surface 14 and rotatable about an axis A.

The example needle indicator assembly 20 includes a primary needle 22 and a secondary needle 24 extending from a hub 26. The tip 28 of the primary needle 22 is positioned to indicate on the primary scale 16, and the tip 30 of the secondary needle 24 is positioned to indicate on the secondary scale 18. The example secondary needle 24 is spaced axially outward of and aligned with the primary needle 22.

Figure 2:
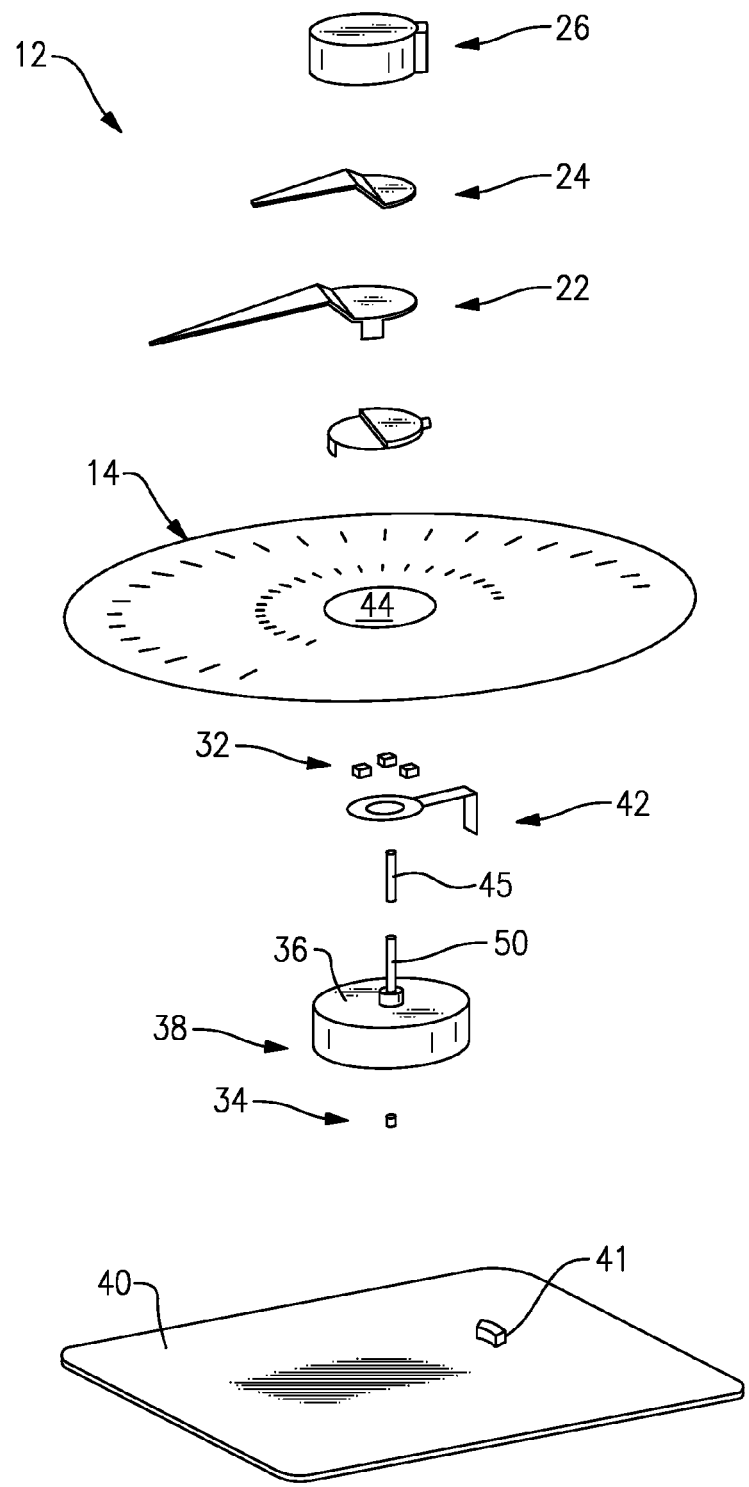
FIG. 2 is an exploded view of the example gauge.
Figure 3:
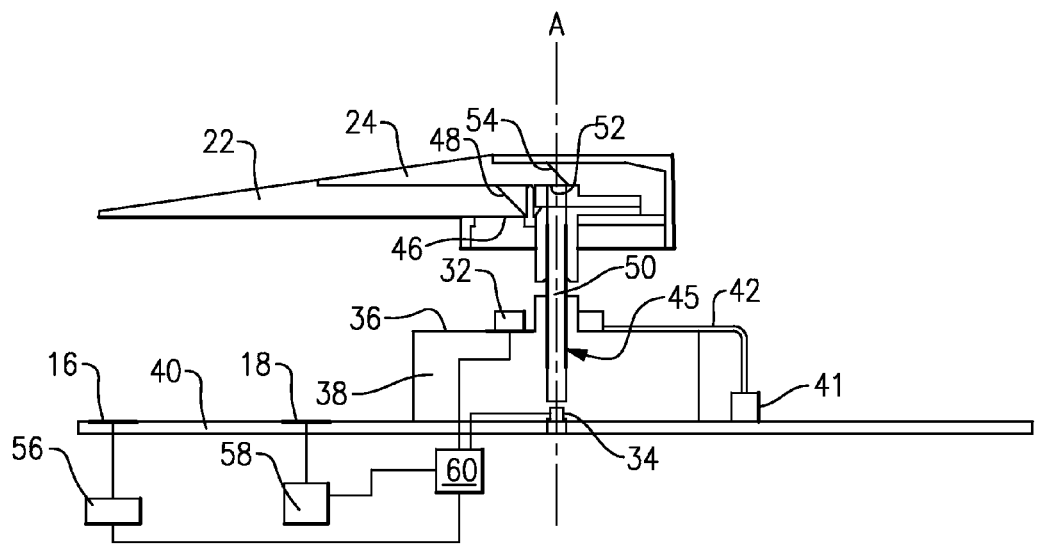
FIG. 3 is a cross section of the example gauge.

Referring to FIGS. 2 and 3, the primary needle 22 and the secondary needle 24 are independently illuminable. The primary needle 22 is illuminated by a primary light source 32, and the secondary needle 24 is illuminated by a secondary light source 34, independently illuminable of the primary light source 32.

The example primary light source 32 comprises a plurality of LEDs spaced circumferentially around the needle indicator axis of rotation and on the opposite side of the dial surface 14 from the primary needle 22. The primary light source 32 is positioned at a top surface 36 of a motor 38 disposed on printed circuit board (PCB) 40 and for driving needle indicator assembly 20. The primary light source is connected to the PCB 40 via a connector 41 and a flexible PCB 40 disposed between the primary light source 32 and the motor top surface 36. The light from the primary light source 32 propagates through an opening 44 in the dial surface 14 to a receiving surface 46 and a reflecting surface 48 of the primary needle 22. The reflecting surface 48 is angled to reflect light radially throughout primary needle 22. Utilizing LEDs spaced circumferentially around the axis of rotation for primary light source 32 allows primary needle 22 to be illuminated throughout its entire path of rotation.

The example secondary light source 34 comprises an LED disposed at the axis of rotation and at PCB 40. The secondary light source 34 propagates light through the clear motor shaft 50 to a receiving surface 52 and a reflecting surface 54 of the secondary needle 24. The reflecting surface 54 is angled to reflect light radially throughout secondary needle 24. A metal sleeve 45 surrounds the clear motor shaft 50 to block light and isolate light to the primary needle 22 from the secondary needle 24.

Figure 4:
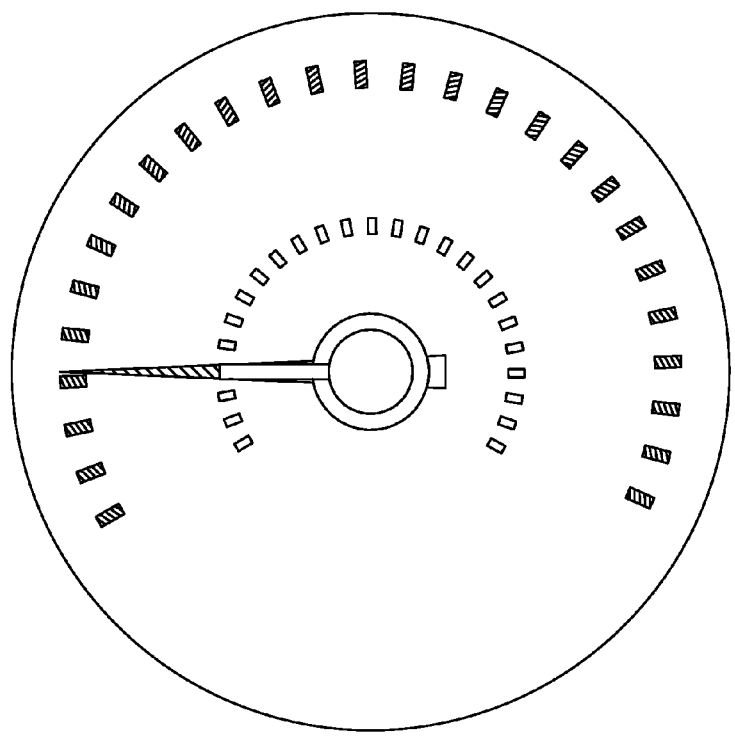
FIG. 4 is a front view of the example gauge.

In the example, the primary scale 16 and the secondary scale 18 are also independently illuminable by primary scale light source 56 and secondary scale light source 58, as shown schematically in FIG. 3. A user may selectively illuminate the primary scale 16, secondary scale 18, primary needle 22, and the secondary needle 24. For example, when a user prefers the primary scale 16, the user may choose to illuminate only the primary needle 22 and the primary scale 16, and to not illuminate the secondary needle 24 and secondary scale 18. In this instance, the user may alternatively choose to illuminate the primary needle 22 and the secondary needle 24, depending on the configuration of needle indicator assembly 20. As another example, when the user prefers the secondary scale 18, the user may choose to only illuminate the secondary needle 24 and secondary scale 18, and to not illuminate the primary needle 22 and the primary scale 16, as shown in FIG. 4.

As one example of selective illumination, a controller 60 is in communication with primary light source 32, secondary light source 34, primary scale light source 56 and secondary scale light source 58, as shown schematically in FIG. 3. The controller 60 may be part of the gauge, or it may be part of a separate stage of the vehicle. The controller 60 may selectively illuminate light sources 32, 34, 56, 58 in response to a vehicle operator input or in response to the vehicle's environment, such as the vehicle's location determined by a GPS.

In the example, the primary needle 22 and the primary scale 16 are illuminated at the same color, and the secondary needle 24 and the secondary scale 18 are illuminated at a second color different from the primary needle and scale color. Of course, other color configurations may be utilized. For example, the primary needle 22 and secondary needle 24 could be the same color, and the needle indicator assembly 20 would appear as a single needle to the user when both the primary and secondary needles are illuminated. The primary scale 16 and secondary scale 18 may alternatively be illuminated the same color as well.

Although an embodiment of this invention has been disclosed, a worker of ordinary skill in this art would recognize that certain modifications would come within the scope of this invention. For that reason, the following claims should be studied to determine the true scope and content of this invention.

We claim:

1. An instrument cluster assembly comprising:
at least one gauge comprising:
a dial surface having a primary scale and a secondary scale;
a needle indicator assembly rotatable about an axis and spaced from said dial surface, said needle indicator assembly comprising a primary needle and a secondary needle, wherein a tip of said primary needle is positioned to indicate on said primary scale, and a tip of said secondary needle is positioned to indicate on said secondary scale;
a primary light source for illuminating said primary needle; and
a secondary light source for illuminating said secondary needle, wherein said primary light source and said secondary light source are independently illuminable.

2. The assembly as recited in claim 1, wherein said primary light source is a different color than said secondary light source.

3. The assembly as recited in claim 1, wherein said primary scale is radially outward of said secondary scale relative to said axis.

4. The assembly as recited in claim 1, wherein said secondary needle is a separate piece from said primary needle and is positioned axially outward of said primary needle relative to said axis.

5. The assembly as recited in claim 1, wherein said primary scale and said secondary scale are independently illuminable by a primary scale light source and a secondary scale light source.

6. The assembly as recited in claim 1, wherein said primary needle and said secondary needle extend from a needle indicator cap.

7. The assembly as recited in claim 1, wherein said primary and secondary light sources comprise LEDs.

8. The assembly as recited in claim 1, wherein said primary light source comprises a plurality of LEDs spaced circumferentially about said axis of rotation and below said dial surface, said plurality of LEDs configured to propagate light through an opening in said dial surface to said primary needle.

9. The assembly as recited in claim 8, wherein said secondary light source comprises an LED disposed at said axis of rotation, said LED configured to propagate light through a shaft to said secondary needle.

10. A gauge assembly comprising:
a dial surface having a primary scale and a secondary scale;
a needle indicator assembly rotatable about an axis and spaced from said dial surface, said needle indicator assembly comprising a primary needle and a secondary needle, wherein a tip of said primary needle is positioned to indicate on said primary scale, and a tip of said secondary needle is positioned to indicate on said secondary scale;
a primary light source for illuminating said primary needle; and
a secondary light source for illuminating said secondary needle, wherein said primary light source and said secondary light source are independently illuminable.

11. The assembly as recited in claim 10, wherein said primary light source is a different color than said secondary light source.

12. The assembly as recited in claim 10, wherein said primary needle is a different color than said secondary needle.

13. The assembly as recited in claim 10, wherein said primary scale is radially outward of said secondary scale relative to said axis.

14. The assembly as recited in claim 10, wherein said secondary needle is a separate piece from said primary needle and is positioned axially outward of said primary needle relative to said axis.

15. The assembly as recited in claim 10, wherein said primary scale and said secondary scale are independently illuminable by a primary scale light source and a secondary scale light source.

16. The assembly as recited in claim 10, wherein said primary needle and said secondary needle extend from a needle indicator cap.

17. The assembly as recited in claim 10, wherein said primary light source comprises a plurality of LEDs spaced circumferentially about said axis of rotation and below said dial surface, said plurality of LEDs configured to propagate light through an opening in said dial surface to said primary needle.

18. The assembly as recited in claim 17, wherein said secondary light source comprises an LED disposed at said axis of rotation, said LED configured to propagate light through a shaft to said secondary needle.

19. A method for making a gauge comprising:
providing a dial surface having a primary scale and a secondary scale;
assembling a primary needle to a rotating shaft for rotation about an axis relative to the gauge surface;
assembling a secondary needle to said rotating shaft for rotation about an axis relative to the gauge surface;
mounting a primary light source for illuminating said primary needle; and
mounting a secondary light source for illuminating said secondary needle.

20. The method as recited in claim 19, further comprising mounting a primary scale light source for illuminating said primary scale; and
mounting a secondary scale light source for illuminating said secondary scale, wherein said primary light source and said secondary light source are independently illuminable, and said primary scale light source and said secondary scale light source are independently illuminable.

* * * * *